United States Patent
Holmes

Patent Number: 6,125,604
Date of Patent: Oct. 3, 2000

[54] CORNER LOCK FOR MITERED CORNER OF A DOOR OR WINDOW FRAME

[76] Inventor: S. D. Holmes, 2265 Birchbark Trail, Clearwater, Fla. 33763

[21] Appl. No.: 09/015,139

[22] Filed: Jan. 29, 1998

[51] Int. Cl.⁷ ...................................................... E04C 2/38
[52] U.S. Cl. ........................... 52/713; 52/656.2; 52/656.4; 52/656.5; 52/656.9; 52/657; 403/401
[58] Field of Search ..................... 52/713, 656.2, 52/656.4, 656.5, 656.9, 657; 403/401, 402; 49/501, 504; 248/351

[56] References Cited

U.S. PATENT DOCUMENTS

| | | | |
|---|---|---|---|
| 3,358,297 | 12/1967 | Kaempfer | 52/713 X |
| 3,390,500 | 7/1968 | Schumak | 52/713 X |
| 3,797,194 | 3/1974 | Ekstein | 52/656.9 X |
| 4,127,347 | 11/1978 | Pritchard | 403/402 |

FOREIGN PATENT DOCUMENTS

| | | | |
|---|---|---|---|
| 2378-971 | 9/1978 | France | 52/656.9 |
| 2429-350 | 1/1980 | France | 52/656.9 |
| 2450-335 | 9/1980 | France | 52/656.4 |
| 881-169 | 7/1980 | Germany | 52/656.9 |

*Primary Examiner*—Beth Aubrey
*Assistant Examiner*—Brian E. Glessner
*Attorney, Agent, or Firm*—Ronald E. Smith; Smith & Hopen, P.A.

[57] ABSTRACT

A corner lock for a mitered corner of a hollow door or window frame includes a pair of braces positioned in the interior of the door or window frame at each corner. The braces are interlocked with one another and extend from an outward part to an inward part of each corner. The first brace is directly attached to interior walls of outward horizontal and vertical parts of a door or window frame. The second brace has an outward end attached to the first brace and an inward end that abuttingly engages the inward corner of the door or window frame. A central screw extends through the first brace and bears against the second brace when advanced. The first brace bends into a convexity and the second brace bends into a concavity when the central screw is advanced. A rigid leg that forms a part of the second brace includes a base that bears against an inward corner when the central screw is advanced so that the mitered corner is strenghthened and locked against movement.

8 Claims, 3 Drawing Sheets

CORNER LOCK FOR MITERED CORNER OF A DOOR OR WINDOW FRAME

BACKGROUND OF THE INVENTION

1. Field of the Invention

This invention relates, generally, to door or window construction. More particularly, it relates to a brace assembly that strengthens and locks against movement the mitered corner of a door or window frame.

2. Description of the Prior Art

The frame of a door or window is weakest at its corners. Typically, a corner of a door or window frame is formed by a horizontal part having a flat end butted against a vertical part having a flat edge. An elongate fastener, known as a flush bolt rod, or similar fastening member is then used to secure the two abutting parts together.

Such construction is quite weak, due to the inherent instability of two flat parts abutting one another at a right angle. More particularly, the respective lengths of the vertical frame parts on opposite sides of the door or window and the horizontal frame parts at the top and bottom thereof provide considerable leverage, i.e., a moment appears where the frame parts flatly abut one another and the forces generated by users of the door or window are amplified and thus cause deterioration of the structural integrity of the window or door frame.

Accordingly, developers of the art of door and window frame construction have introduced mitered parts to eliminate the problems associated with abutting flat parts. However, firmly securing the junction of two mitered parts that meet to form a corner of a hollow door or window frame has also proved problematic. A number of techniques have been tried, but due to the moment of forces acting on the corners of such a frame, no construction technique has heretofore been found that provides a durable door or window frame having corners formed of mitered parts.

Moreover, in view of the art considered as a whole at the time the present invention was made, it was not obvious to those of ordinary skill in this art how the needed door or window construction could be provided.

SUMMARY OF THE INVENTION

The longstanding but heretofore unfulfilled need for an apparatus that overcomes the limitations of the prior art is now met by a new, useful, and nonobvious invention. The present invention provides a corner lock for a mitered corner of a hollow door or window frame, including a first brace having a flat central plate and a pair of flat wings integrally formed therewith. The wings are disposed at opposite ends of the flat central plate at a predetermined common angle relative to the flat central plate.

The first brace is postioned within the hollow frame such that a first flat wing of the pair of flat wings overlies and abuttingly engages an interior surface of a horizontal, outward part of a door frame and such that a second flat wing of the pair of flat wings overlies and abuttingly engages an interior surface of a vertical, outward part of the door frame.

A second brace has a flat central plate and a pair of flat wings integrally formed therewith. Each of the wings are disposed at opposite ends of the flat central plate and each of the wings are disposed at a predetermined common angle relative to the flat central plate.

The second brace is spaced apart from the first brace in evenly spaced registration therewith.

A first fastener member connects a first wing of the first brace to an outward horizontal part of the door or window frame and interconnects a first wing of the second brace to the first wing of the first brace in said spaced apart relation. A second fastener member connects a second wing of the first brace to an outward vertical part of the door or window frame and interconnects a second wing of the second brace to the second wing of the first brace in said spaced apart relation.

An elongate, rigid, flat leg plate is secured at an outward end thereof to the flat central plate of the second brace. The leg plate is disposed normal to the flat central plate of the second brace. A base means is integrally formed in an inward end of the leg plate. The base means is adapted to overlie and abuttingly engage an inward corner of the door or window frame, said inward corner being defined by the convergence of a mitered inward horizontal frame part and a mitered inward vertical frame part.

A central screw extends through and screw-threadedly engages the central plate of the first brace, at the center of the central plate. The central screw has a leading end that abuttingly engages the central flat plate of the second brace, centrally thereof. Accordingly, the base means bears with increasing force against the inward corner of the frame as the central screw is advanced. The central flat plate of the first brace flexes and forms a convexity (when viewed in side elevation) and the central flat plate of the second brace flexes and forms a concavity (when viewed in the same side elevation) as the central screw is advanced. The result is a very firmly braced corner. Each of the four corners of a door or window frame is provided with the novel bracing assembly.

It is a primary object of this invention to provide a brace assembly for the mitered corners of a door or window frame that is resistant to forces acting thereagainst.

Another object is to provide a brace assembly that is easy to install and which does not appreciably increase the cost of a door or window frame.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
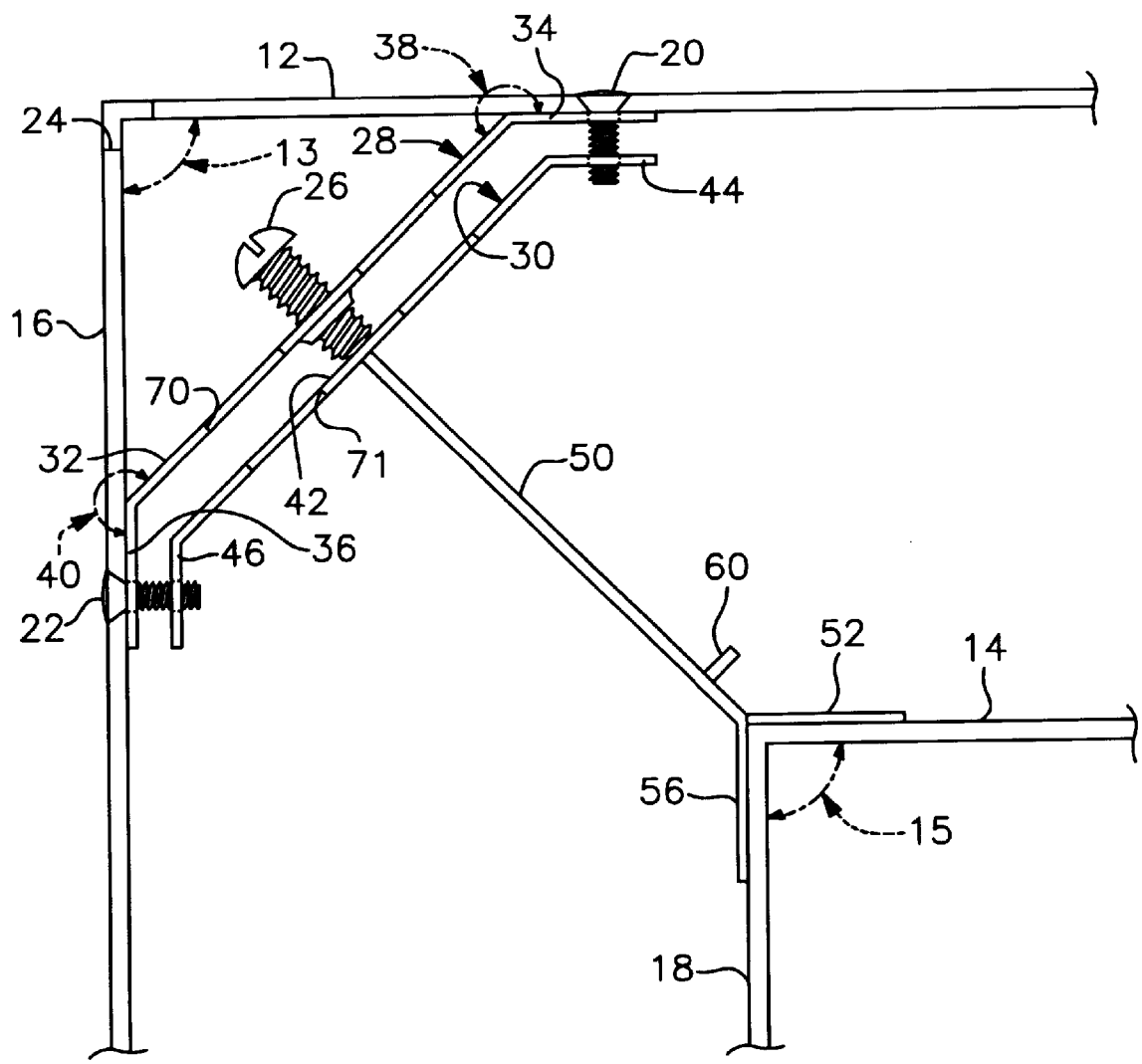
FIG. 1 is a sectional, elevational view depicting the novel construction.

Referring now to FIG. 1, it will there be seen that an exemplary embodiment of the invention is denoted as a whole by the reference numeral 10.

Parts 12 and 14 are the top and bottom walls, respectively, of a hollow, parallelepiped, horizontal part that forms the top part of a door frame. Parts 16 and 18 are the exterior and interior walls, respectively, of a hollow, parallelepiped, vertical part that forms one of the upstanding sides of a door frame. Outward parts 12 and 16 abut one another at a ninety degree angle denoted 13 to form an outward corner of a door or window frame and inward parts 14 and 18 abut one another at a ninety degree angle denoted 15 to form an inward corner of a door or window frame. Thus, it is clear that the top part of the door or window frame and the side part thereof are mitered to form a corner. The unillustrated remaining three corners of the construction have the same structure, of course.

A countersunk screw-receiving aperture is formed in outward, horizontal frame part 12 to accommodate screw 20 and a similar aperture is formed in outward, vertical frame part 16 to receive screw 22. An aperture 24 is also formed at the juncture of parts 12 and 16, centrally thereof, to provide screwdriver access to screw 26. Thus it is clear that the novel assembly is held together by only three screws; it follows that the time to install the novel braces is nominal.

The novel braces are denoted 28 and 30, respectively, as a whole.

First brace 28 has a flat central part 32 and a pair of flat wings 34, 36, that are disposed at a common angle relative to said flat central part. When defined as exterior angles 38, 40, respectively, said common angle is 225° and when defined as interior angles, said common angle is 135°. Accordingly, wings 34, 36 abut flatly against the respective interior flat surfaces of outward frame parts 12, 16 as depicted, and central part 32 of brace 28 spans said parts 12 and 16 as depicted.

Second brace 30 has a more complex construction, but it also includes a flat central part 42 that is flanked by flat wings, respectively denoted 44, 46, that are bent at the same common angle relative to said central part, i.e., at 225° if said common angle is defined as an exterior angle.

Figure 2:
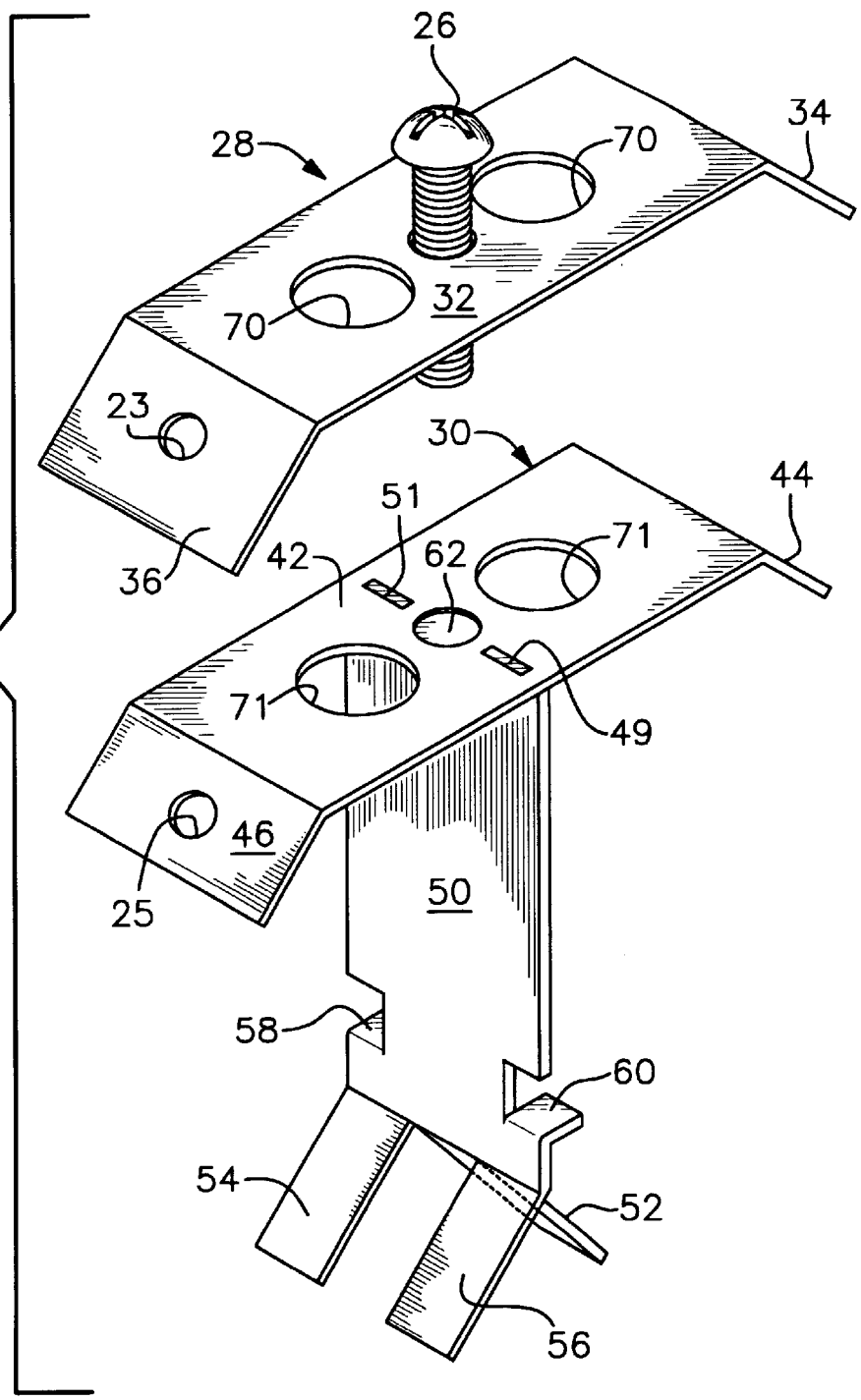
FIG. 2 is an exploded perspective view of the novel parts depicted in FIG. 1.

Wings 34 and 36 of first brace 28 are centrally apertured, as are wings 44, 46 of second brace 30. As indicated in FIG. 2, the aperture formed in wing 36 is denoted 23 (the aperture formed in wing 34 not being visible in this particular view), and the aperture formed in wing 46 is denoted 25 (the aperture formed in wing 44 not being visible). Aperture 23 and its unillustrated counterpart are internally threaded and thus screw-threadedly receive screws 22 and 20, respectively. Moreover, aperture 25 and its unillustrated counterpart are internally threaded as well and thus screw-threadedly receive screws 22 and 20, respectively.

It follows, then, that tightening screws 20 and 22 secures first brace 28 to frame parts 12 and 16 and also draws wings 44 and 46 of second brace 30 toward wings 34 and 36 of said first brace, respectively.

Second brace 30 further includes a rigid flat leg 50 that is attached to central flat plate 42 at an outward end thereof and which is disposed at ninety degrees thereto. Although numerous attachment means could be employed, all of which are within the scope of this invention, the preferred attachment means includes a pair of slots formed in flat central plate 42 and a pair of corresponding tongues formed in the outward end of flat leg 50 that fit within said slots. The tongues are denoted 49, 51 in FIG. 2 and the slots are unnumbered to avoid cluttering the drawings.

Note that flat central plate 32 of first brace 28 and flat central plate 42 of second brace 30 have a common predetermined longitudinal extent greater than a common predetermined transverse extent thereof. Note further that rigid, flat leg 50 is rotationally oriented with respect to flat central plate 42 of second brace 30 such that it transversely bisects said flat central plate 42. Leg 50 is therefore coincident with an imaginary line that extends from the center of the outward corner defined by frame parts 12 and 16 to the center of the inward corner defined by frame parts 14 and 18. Said imaginary line also passes through the rotational axis of central screw 26 and the center of opening 24.

The inward end of leg 50 is trifurcated; a middle section or base 52 of said trailing end is bent at a 135° angle relative to the main body thereof and the outlying sections or bases 54 and 56 are bent at the same angle relative to said main body but in an opposite direction. A pair of ears 58, 60 are also stamped out of the main body of leg 50 and bent in a common direction at a ninety degree angle.

Thus, base 52 is disposed normal to bases 54, 56. As best understood in connection with FIG. 1, base 52 overlies inward, horizontal frame part 14 and bases 54, 56 overlie inward, vertical frame part 18.

Screw 26 is screw-threadedly received in an internally-threaded, centrally disposed aperture formed in flat central plate 32 of first brace 28, and the leading end of said screw 26 bears against a recessed dimple 62 (FIG. 2) formed in the center of flat central plate 42 of second brace 30. Accordingly, advancing screw 26 causes base members 52, 54, and 56 to bear against the mitered corner defined by inward parts 14, 18, as is best understood in connection with FIG. 1. Thus, a slight concavity will appear in central flat plate 42 of second brace 30 and a slight convexity will appear in flat central plate 32 of first brace 28. The convexity and concavity are centered on the aforementioned imaginary line, it being clear that that the forces generated by the novel brace assembly act both along said imaginary line and on equidistantly spaced opposite sides thereof as represented by the forces appearing where wings 34 and 36 of the first brace are secured to outward walls 12 and 16, respectively, and to wings 44 and 46 of the second brace, respectively. The convexity and concavity appear when the assembly is viewed in a side view such as that provided by FIG. 1; both are shown in exaggerated form and in dotted lines that are unnumbered to avoid cluttering the drawing.

Note that dimple 62 provides a self-centering function for screw 26.

A first pair of clearance holes, collectively denoted 70, are formed in flat central plate 32 of first brace 28 on opposite sides of screw 26, and a second pair of clearance holes, collectively denoted 71, are formed in flat central plate 42 of second brace 30 on opposite sides of dimple 62. Holes 70, 71 are provided to admit an elongate flush bolt therethrough which is unillustrated because it is conventional and well known and performs no part of the present invention per se. Only one set of clearance holes is needed to provide the needed clearance, but both halves of plates 32 and 42 are provided with said holes so that an installer need not pay attention to the orientation of said plates when they are installed. The unillustrated flush bolt is commonly used in prior art frames to help secure the flat abutting ends of unmiterd frame corners.

The depicted door or window frame is typically made of aluminum, but the inventive construction is not restricted to aluminum environments.

Figure 3A:
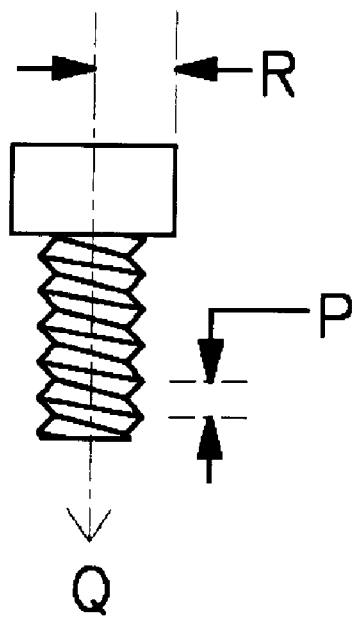
FIG. 3A is a side elevational view of a screw.
Figure 3B:
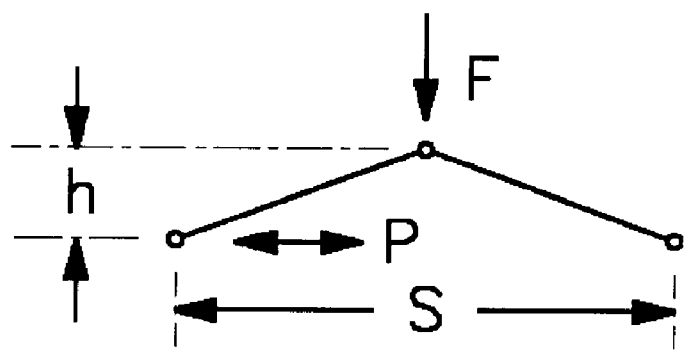
FIG. 3B is a schematic diagram of the novel assembly that explains how to calculate the pulling force created by said assembly.

Although the mathematics that quantify the actual forces created by the novel assembly need not be disclosed to enable one of ordinary skill in the mechanical arts to make and use the invention, FIGS. 3A and 3B are nonetheless provided, together with the following mathematical explanation, so that it will be apparent how to modify the various dimensions of the novel structure in order to increase or decrease its pulling force, as may be required by differing applications.

In FIG. 3B, Q represents the force generated by a conventional ¼–20 screw, P is the pitch of the screw, R is the radius of the head of the screw, and F is the turning force or torque applied to the head. From standard textbooks, Q=F× (6.2832 R)/P. If the screw is adapted to be turned by a flathead screwdriver having a 1¼" diameter handle, i.e., having a radius of 0.625", and if the torque force applied to the handle is 45 pounds and the pitch P of the screw is ½0 or 0.05, then Q=45×(6.2832×0.625)/0.05=3534 pounds of pressure.

Referring now to FIG. 3B, where height h=0.250", where span S=3.5", and force Q (renamed F) is 3534 pounds, then the pull P, which from textbooks is known to be equal to FS/4h, is (3534×3.5)/1 or 12,369 pounds. Thus, a routine forty five pounds of torque applied to a common screw generates more than six tons of pulling force, explaining why the novel assembly locks the mitered corners of a door or window frame so tightly. This force is safely below the shear strength (20,598 pounds) of a steel plate having a thickness of 3/16".

It will thus be seen that the objects set forth above, and those made apparent from the foregoing description, are efficiently attained and since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A corner lock adapted to be mounted in a mitered corner of a hollow door or window frame, comprising:

a first brace adapted to be disposed within said hollow frame;

said first brace having a central plate and a pair of wings that are interconnected to opposite ends of said central plate and that are respectively adapted to be secured to an outward horizontal part of a door frame and to an outward vertical part of said door frame;

a second brace adapted to be disposed within said hollow frame, in spaced apart, parallel relation to said first brace;

said second brace having a central plate and a pair of wings that are connected to opposite ends of said central plate in spaced relation thereto;

an elongate, rigid leg connected at an outward end thereof to said central plate of said second brace;

said elongate, rigid leg including a base means formed at an inward end thereof that is adapted to abuttingly engage an inward corner of said door or window frame;

said wings and said central plate of said second brace being spaced apart from said wings and said central plate of said first brace;

a first fastener means adapted to immovably secure a first wing of said first brace to a horizontal part of said door frame;

said first fastener means also immovably securing said first wing of said first brace to a first wing of said second brace, said respective first wings of said first and second braces being immovable with respect to said horizontal part of said door frame and with respect to one another;

a second fastener means adapted to immovably secure a second wing of said first brace to a vertical part of said door frame;

said second fastener means also immovably securing said second wing of said first brace to a second wing of said second brace, said respective second wings of said first and second braces being immovable with respect to said vertical part of said door frame and with respect to one another;

a central screw extending through and screw-threadedly engaging said central plate of said first brace and said central screw having a leading end that bears against said central plate of said second brace;

said central screw for driving said base means into increasingly tighter abutting engagement with said inward corner when said central screw is advanced, thereby strengthening and locking said mitered corner; and said central screw bending said central part of said first brace into a convexity and said central part of said second brace into a concavity when said central screw is advanced.

2. The corner lock of claim 1, further comprising a dimple formed in said central plate of said second brace, centrally thereof, said dimple receiving said leading end of said central screw and serving to center said central screw as it is advanced.

3. The corner lock of claim 1, wherein said respective central plates of said first brace and said second brace are disposed in substantially parallel relation to another, and wherein said wings of said first brace and said second brace are disposed in substantially parallel relation to one another.

4. A corner lock adapted to be mounted in a mitered corner of a hollow door or window frame, comprising:

a first brace having a flat central plate and a pair of flat wings integrally formed therewith, said flat wings being disposed at opposite ends of said flat central plate and said flat wings being disposed at a predetermined common angle relative to said central plate;

said first brace adapted to be positioned within said hollow frame such that a first flat wing of said pair of flat wings is adapted to overlie and abuttingly engage an interior wall of an outward horizontal part of a door frame and such that a second flat wing of said pair of flat wings is adapted to overlie and abuttingly engage an interior wall of an outward vertical part of said door frame;

a second brace having a flat central plate and a pair of flat wings integrally formed therewith, each of said flat wings being disposed at opposite ends of said flat central plate of said second brace and each of said flat wings being disposed at a common predetermined angle relative to said flat central plate of said second brace;

said second brace being spaced apart from said first brace in closely spaced, parallel registration therewith, said second brace being spaced inwardly of said first brace relative to said hollow door or window frame;

a pair of fastener members, a first fastener member of said pair adapted to immovably secure a first flat wing of said first brace to an outward horizontal part of said door or window frame and adapted to immovably secure a first flat wing of said second brace to said first flat wing of said first brace;

a second fastener member of said pair adapted to immovably secure a second flat wing of said first brace to an outward vertical part of said door or window frame and immovably secure a second flat wing of said second brace to said second flat wing of said first brace;

an elongate, rigid, flat leg plate secured at an outward end thereof to said flat central plate of said second brace, said leg plate being disposed normal to said flat central plate of said second brace;

a base means integrally formed in a distal end of said leg plate, said base means adapted to overlie and abuttingly engage an inward corner of said door or window frame;

a central screw extending through and screw-threadedly engaging said flat central plate of said first brace;

said central screw having an inward end that abuttingly engages said central flat plate of said second brace;

whereby said base means is adapted to bear with increasing force against said inward corner as said central screw is advanced, thereby strengthening and locking said mitered corner; and whereby said central flat plate of said first braces flexes and forms a convexity and said central flat plate of said second braces flexes and forms a concavity as said central screw is advanced.

5. The corner lock of claim 4, wherein said common predetermined angle of said flat wings with respect to said flat central plate of said first brace is about two hundred twenty five degrees.

6. The corner lock of claim 5, wherein said common predetermined angle of said flat wings with respect to said flat central plate of said second brace is about two hundred twenty five degrees.

7. The corner lock of claim 4, wherein said flat central plate of said first brace and said flat central plate of said second brace have a common predetermined longitudinal extent greater than a common predetermined transverse extent thereof.

8. The corner lock of claim 4, wherein said flat leg of said second brace is rotationally oriented with respect to said flat central plate of said second brace such that it transversely bisects said flat central plate of said second brace.

* * * * *